United States Patent [19]

Kawamura

[11] Patent Number: 4,850,193

[45] Date of Patent: Jul. 25, 1989

[54] CONTROL SYSTEM FOR TURBOCHARGER WITH ROTARY ELECTRIC MACHINE

[75] Inventor: Hideo Kawamura, Samukawa, Japan

[73] Assignee: Izusu Motors, Ltd, Tokyo, Japan

[21] Appl. No.: 254,870

[22] Filed: Oct. 7, 1988

[30] Foreign Application Priority Data

Oct. 9, 1987 [JP] Japan .............................. 62-255202

[51] Int. Cl.⁴ ............................................ F02B 37/10
[52] U.S. Cl. ................................................... 60/608
[58] Field of Search .......................... 60/597, 607, 608

[56] References Cited

U.S. PATENT DOCUMENTS 4,745,755 5/1988 Kawamura ............................ 60/608
4,757,686 7/1988 Kawamura et al. .................. 60/608
4,774,811 10/1988 Kawamura ............................ 60/608

Primary Examiner—Michael Koczo
Attorney, Agent, or Firm—Staas & Halsey

[57] ABSTRACT

A control system for a turbocharger with a rotary electric machine on a motor vehicle detects the amount of depression of an accelerator pedal, calculates a maximum engine torque corresponding to the rotational speed of an engine on the motor vehicle when the accelerator pedal is fully depressed, calculates an amount of electric power, to be supplied to the rotary electric machine, required to produce a maximum boost pressure corresponding to the calculated maximum engine torque, and supplies the calculated amount of electric power to the rotary electric machine.

2 Claims, 4 Drawing Sheets

CONTROL SYSTEM FOR TURBOCHARGER WITH ROTARY ELECTRIC MACHINE

BACKGROUND OF THE INVENTION

The present invention relates to a control system for a turbocharger with a rotary electric machine or a motor-generator mounted on the rotatable shaft of the turbocharger.

Various proposals have been made to mount a turbocharger on the exhaust pipe of an internal combustion engine and couple a motor-generator to the rotatable shaft of the turbocharger for recovering the energy of exhaust gases emitted from the internal combustion engine.

Japanese Laid-Open Patent Publication No. 62-48932 discloses a proposed control device for a turbocharger combined with an internal combustion engine and associated with a motor-generator which can operate as a generator or a motor dependent on the rotational speed of and the load on the engine.

According to the proposed control device, when the motor-generator is operated as a generator, generated electric power is supplied to an electric load or a battery, and when the motor-generator is operated as a motor, it assists the turbocharger in supercharging the engine to increase the output power of the engine. However, the disclosed control device does not have a means for controlling the boost pressure of a turbocharger at an optimum boost level dependent on a change in the running conditions of a motor vehicle. Therefore, even under such running conditions for the motor vehicle to require quick acceleration, the boost pressure of the turbocharger may be too low to achieve desired acceleration when the accelerator pedal of the motor vehicle is depressed a full stroke.

SUMMARY OF THE INVENTION

It is an object of the present invention to provide a control system for a turbocharger with a rotary electric machine on a motor vehicle, the control device being operable to obtain a boost pressure for producing a maximum engine torque to achieve acceleration according to the intention of the driver of the motor vehicle, dependent on the running conditions of the motor vehicle, particularly when the accelerator pedal of the motor vehicle is depressed a full stroke.

According to the present invention, there is provided a control system for a turbocharger including a turbine drivable by exhaust gases emitted from an internal combustion engine on a motor vehicle, a rotatable shaft coupled to the turbine, a compressor coupled to said rotatable shaft for charging air under pressure into the internal combustion engine, and a rotary electric machine coupled to the rotatable shaft, said control system comprising: means for detecting the amount of depression of an accelerator pedal which controls operation of said internal combustion engine; means for detecting the rotational speed of said internal combustion engine; a battery mounted on said motor vehicle; means for calculating a maximum engine torque corresponding to the rotational speed of said internal combustion engine when said accelerator pedal is fully depressed; means for calculating an amount of electric power, to be supplied to said rotary electric machine, required to produce a maximum boost pressure corresponding to the calculated maximum engine torque; and means for supplying said calculated amount of electric power from said battery to said rotary electric machine.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
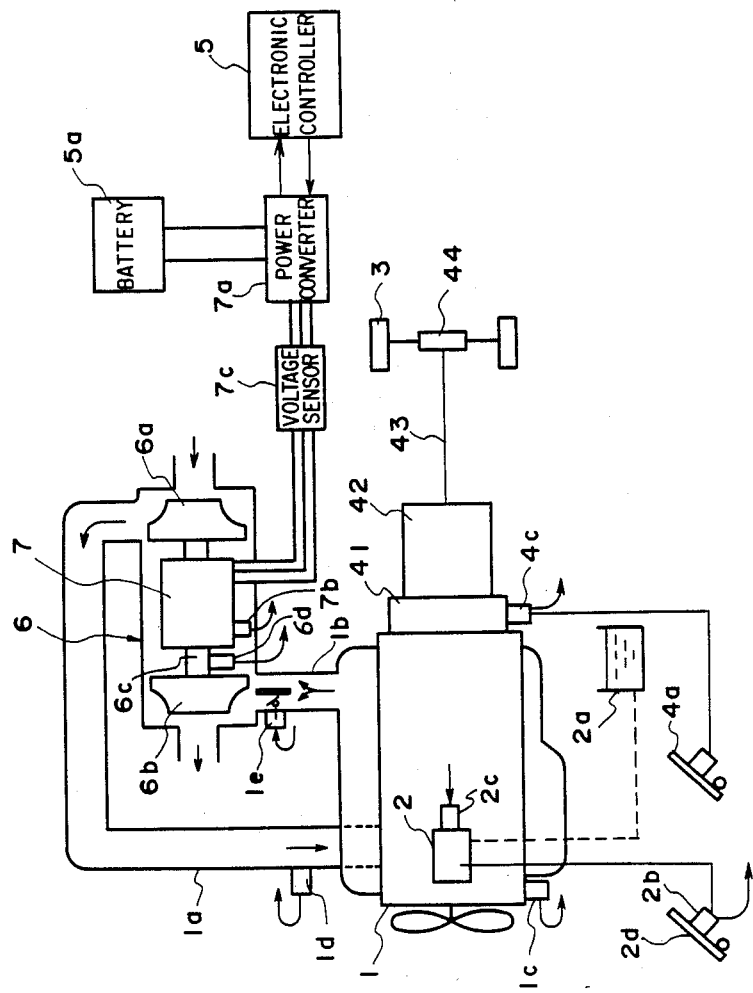
FIG. 1 is a schematic view, partly in block form, of a control system for a turbocharger with a rotary electric machine according to the present invention.

FIG. 1 schematically illustrates a control system for a turbocharger with a rotary electric machine on a motor vehicle, according to the present invention.

In FIG. 1, an internal combustion engine 1 on a motor vehicle draws air from an intake pipe 1a, burns fuel supplied from a fuel tank 2a and injected by a fuel injector 2 to generate the combustion energy, and discharges exhaust gases from an exhaust pipe 1b.

Engine output power generated by the combustion energy produced by the engine 1 is transmitted through a clutch 41, a transmission 42, a propeller shaft 43, and a final speed reducer 44 to road wheels 3 for thereby driving the motor vehicle.

Denoted at 1c is an engine speed sensor for detecting the rotational speed of the engine 1, 2b an accelerator pedal movement sensor for detecting the amount of depression of an accelerator pedal 2d, and 4c a clutch sensor for detecting the engagement and disengagement of the clutch 41 which is operated by a clutch pedal 4a. Detected signals from these sensors 1c, 2b, 4c are sent to an electronic controller 5a.

A turbocharger 6 is connected to the exhaust pipe 1b and the intake pipe 1a and has a turbine 6b drivable by the energy of exhaust gases flowing through the exhaust pipe 1b and a compressor 6a for supercharging air into the engine 1. The turbine 6b and the compressor 6a are coupled to each other by a rotatable shaft 6c on which a rotary electric machine 7 operable as an electric motor or generator is mounted. When the turbine 6b is rotated by the exhaust energy, the rotary electric machine 7 operates in a generator mode in which generated electric power is transmitted to a power converter 7a which charges a battery 5a on the motor vehicle. The power converter 7a has various power control circuits such as a rectifier/smoother for converting AC electric power into DC electric power, a converter for converting the voltage of the DC electric power to a desired voltage an inverter for converting the DC electric power into AC electric power of adjustable frequency, and a duty cycle controller employing semiconductor control elements for controlling the voltage or current. These various power control circuits are controlled by control commands from the electronic controller 5. For increasing the torque produced by the engine 1, the power converter 7a converts, under a command signal from the electronic controller 5, DC electric power from the battery 5a into AC electric power and supplies the AC electric power to the rotary electric machine 7 to operate the same in a motor mode. The compressor 6a is driven to compress air for thereby increasing the pressure at which to charge air into the engine 1.

A bypass actuator 1e disposed on the inlet of the turbine 6b in the exhaust pipe 1b controls the exhaust gas passage such that when the exhaust energy is small, the exhaust gas passage is reduced to increase the speed of flow of exhaust gases therethrough. A boost sensor 1d is attached to the intake pipe 1a for detecting the intake air pressure in the intake pipe 1a. A turbine speed sensor 6d is mounted on the rotatable shaft 6c of the turbocharger 6 for detecting the rotational speed of the turbocharger 6. A phase sensor 7b is mounted on the rotary electric machine 7 for detecting the phase of the magnetic field and rotor output of the rotary electric machine 7. A voltage sensor 7c serves to measure the voltage of the rotary electric machine 7. Detected signals from these sensors 1d, 6d, 7b, 7c are also sent to the electronic controller 5.

The electronic controller 5 comprises a microcomputer having a central processing unit for effecting arithmetic calculations on signals applied by the sensors and comparing various counts, memories for storing a control program and various data, and an input/output unit for receiving various signals and transmitting control commands. The electronic controller 5 also applies a signal to an actuator 2c for actuating the fuel injector 2 to control the supply of fuel to the engine 1. The memories of the electronic controller 5 also store boost pressures for amounts of fuel to be supplied dependent on different accelerator pedal positions, data on engine rotational speeds corresponding to such different accelerator pedal positions, and a map of these boost pressures and speed data.

Figure 2:
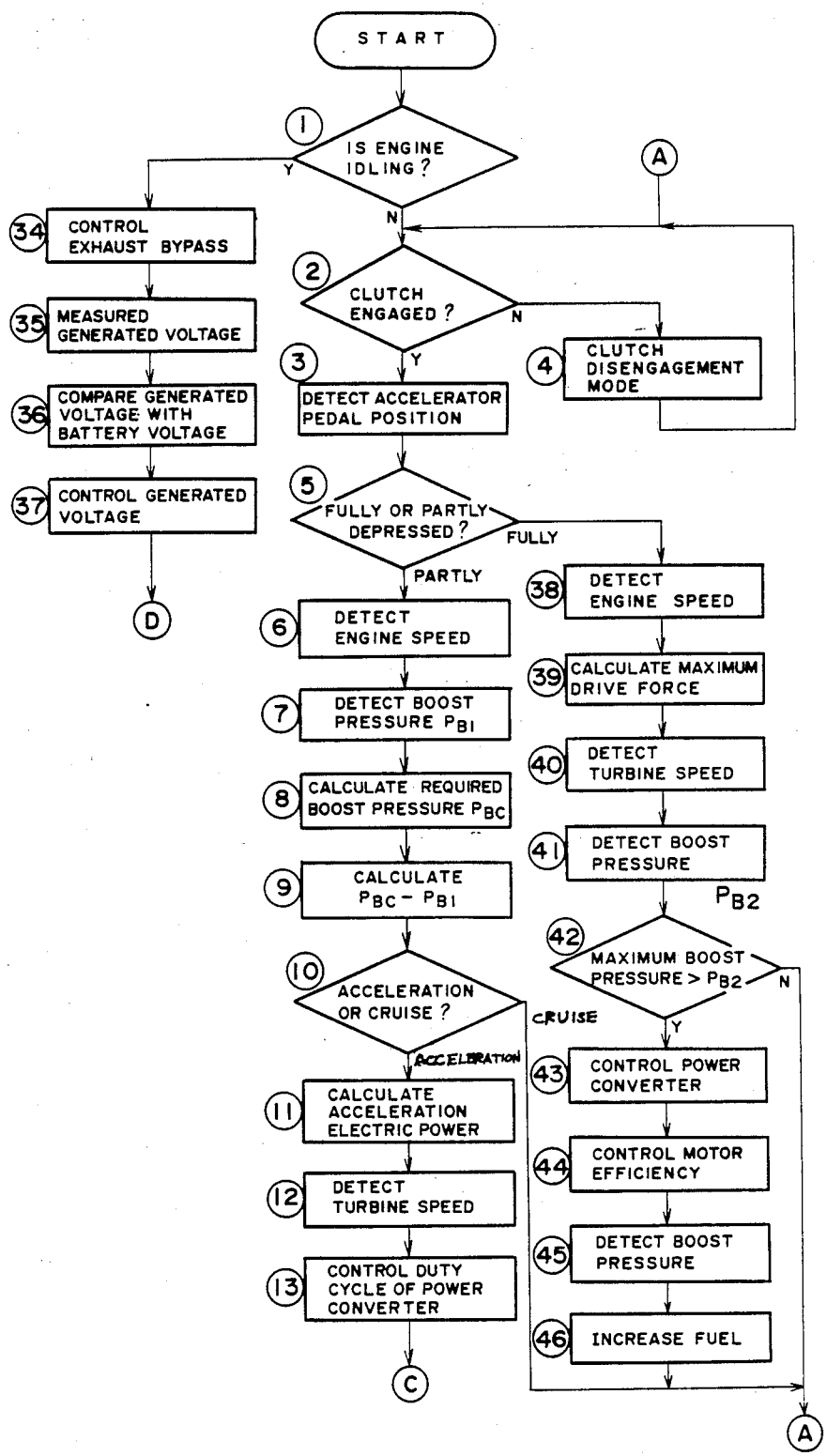
FIGS. 2(a) and 2(b) are a flowchart of an operation sequence of the control system.
Figure 2:
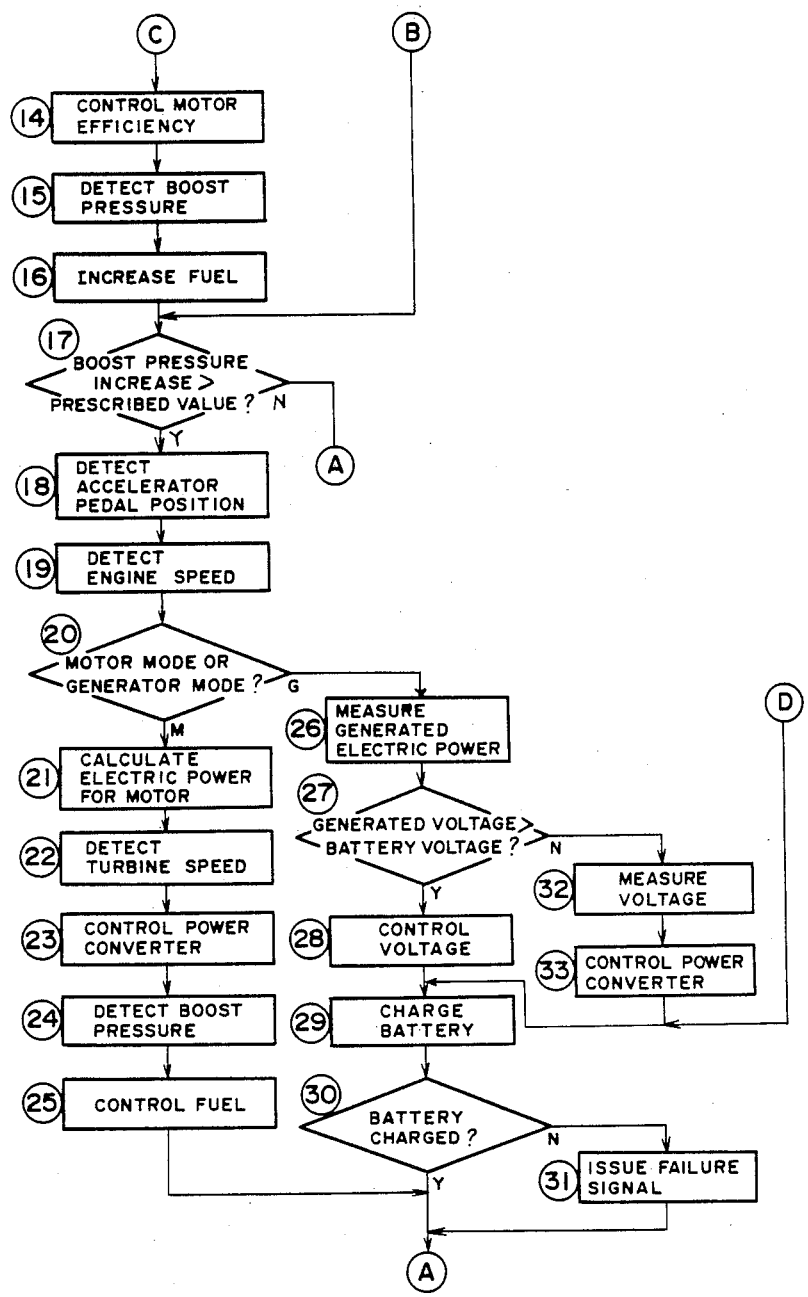

FIGS. 2(a) and 2(b) show an operation sequence of the control system of the present invention. In the illustrated embodiment, the rotary electric machine 7 is operated selectively in a motor mode and a generator mode dependent on the relationship between the rotational speed of the engine 1 and the torque produced by the engine 1.

Operation of the control system will be described with reference to FIGS. 2(a) and 2(b).

A step 1 determines whether the engine 1 is idling or not based on a detected signal from the engine speed sensor 1c. If the engine 1 is not idling in the step 1, then control proceeds to a step 2 which checks if the clutch 41 is engaged or not based on a detected signal from the clutch sensor 4c. If the clutch 41 is engaged, then control goes to a step 3, and if not, then control goes to a step 4 for the control of a clutch disengagement mode.

In the step 3, a signal from the accelerator pedal movement sensor 2b is read to check whether the accelerator pedal 2d is partly or fully depressed. If the accelerator pedal 2d is partly depressed, then control goes to steps 6 through 9. The step 6 reads an engine speed signal from the engine speed sensor 1c, and the step 7 reads a boost signal ($P_{Bl}$) from the boost sensor 1d. Then, the step 8 calculates a boost pressure $P_{BC}$) required to meet running conditions based on the amount of depression of the accelerator pedal 2d which has been read in the step 3 and the engine rotational speed which has been read in the step 6. The step 9 then calculates the difference ($P_{BC}-P_{Bl}$) between the required boost pressure ($P_{BC}$) and the present boost pressure ($P_{Bl}$) read in the step 7.

A step 10 determines whether the driver intends to accelerate the motor vehicle or cruise the same at a constant speed, based on the result ($P_{BC}-P_{Bl}$) calculated in the step 9. If the difference ($P_{BC}-P_{Bl}$) is larger than a prescribed value, then it is determined that the driver intends to accelerate the motor vehicle. Conversely, if the difference ($P_{BC}-P_{Bl}$) is smaller than the prescribed value, then it is determined that the driver intends to cruise the motor vehicle.

If the motor vehicle is accelerated in the step 10, control then goes to steps 11 through 14. In the step 11, acceleration electric power corresponding to the difference ($P_{BC}-P_{Bl}$) between the required boost pressure ($P_{BC}$) and the present boost pressure $P_{Bl}$ is calculated. Then, the step 12 reads a turbine speed signal from the turbine speed sensor 6d, and the step 13 controls the duty cycle of the power converter 7a in order to supply electric power based on the calculated amount to the rotary electric machine 7. In the step 14, efficiency control such as phase control is effected on the rotary electric machine 7 when it is operated as a motor, based on a phase signal from the phase sensor 7b. By thus operating the rotary electric machine 7 as a motor with electric power in an amount corresponding to the difference between the required boost pressure ($P_{BC}$) and the present boost pressure ($P_{Bl}$), the boost pressure can be increased up to a pressure level required by desired vehicle acceleration.

Then, a step 15 reads a boost signal from the boost sensor 1d, and a step 16 increases the amount of fuel to be supplied up to a level which corresponds to the boost pressure indicated by the boost signal.

A step 17 checks a boost pressure increase, i.e., determines whether the boost pressure detected in the step 15 has increased from the boost pressure detected in the step 7 by a prescribed value. If the boost pressure increase is greater than the prescribed value in the step 17, then a step 18 reads an accelerator pedal depression signal from the accelerator pedal movement sensor 2b, and a step 19 reads an engine speed signal from the engine speed sensor 1c.

Figure 3:
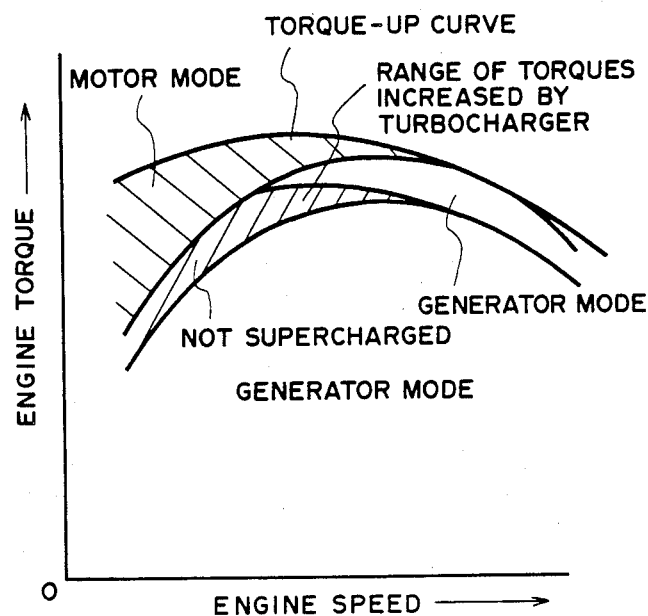
FIG. 3 is a graph showing motor and generator operation ranges of the rotary electric machine.

A step 20 then determines whether the rotary electric machine 7 is in a motor mode or a generator mode in the map of FIG. 3 based on the accelerator pedal depression signal and the engine speed signal. If in the motor mode, then control proceeds to a step 21, and if in the generator mode, then control goes to a step 26.

In the step 21, electric power is calculated in the same manner as the step 11 to drive the rotary electric machine as the motor. A step 22 detects a turbine rotational speed from the turbine speed sensor 6d. Then, control goes to step 23 through 25 to supply electric power from the battery 5a, as controlled by the power converter 7a, to the rotary electric machine 7, thus operating the rotary electric machine 7 as the motor to drive the compressor 6a to increase the boost pressure. The boost pressure is detected and the amount of fuel supplied is controlled by controlling the actuator 2c of the fuel injector 2 dependent on the detected boost pressure.

If the rotary electric machine 7 is operated as the generator, the voltage of the generated electric power is measured by the voltage sensor 7c in the step 26, and then compared with the battery voltage in a step 27. If the generated voltage is higher than the battery voltage, then control goes to steps 28 through 30 to charge the battery 5a. If the generated voltage is lower than the battery voltage, then control goes to steps 32, 33 for enabling the power converter 7a to increase the generated voltage to charge the battery 5a. If the battery is not charged in the step 30, then control goes to a step 31 which produces a failure signal to give a warning.

If the accelerator pedal 2d is fully depressed in the step 5, then control goes to steps 38 through 46. The step 38 reads an engine speed signal from the engine speed sensor 1c, and the step 39 calculates a maximum engine torque corresponding to the detected engine speed. The maximum engine torque is an engine torque corresponding to a torque-up curve shown in FIG. 3.

Then, the step 40 reads a turbine speed signal from the turbine speed sensor 6d, and the step 41 reads a boost signal from the boost sensor 1d to detect a present boost pressure ($P_{B2}$). The step 42 compares a maximum engine boost pressure corresponding to the maximum engine torque calculated in the step 39 and the present boost pressure ($P_{B2}$) detected in the step 41. If the present boost pressure ($P_{B2}$) is lower than the maximum boost pressure, then electric power to be supplied to the rotary electric machine 7 for equalizing the boost pressure to the maximum boost pressure corresponding to the maximum drive torque. In the step 43, the power converter 7a is controlled to supply the electric power to the rotary electric machine 7. In addition, efficiency control such as phase control of the electric power to be supplied to the rotary electric machine 76 is effected based on a signal from the phase sensor 7b in the same manner as the step 14.

The step 45 then detects a present boost pressure after the rotary electric machine 7 has been operated as the motor, based on a boost signal from the boost sensor 1d, and the step 46 increases supplied fuel up to an amount corresponding to the present boost pressure. After the fuel control in the step 46, control returns to the step 2 to execute the above steps again. If the present boost pressure ($P_{B2}$) detected in the step 41 is higher than the maximum boost pressure in the step 42, then control also goes back to the step 2.

Thus, if the accelerator pedal 2d is fully depressed, the rotary electric machine 7 is driven as the motor in order to obtain a maximum boost pressure required to produce the maximum engine torque. The rotary electric machine 7 remains to operate as the motor for obtaining the maximum boost pressure even if the boost pressure increases, insofar as the accelerator pedal 2d is depressed the full stroke. Therefore, the motor vehicle can achieve acceleration as intended by the driver, and thus can be started quickly.

If the engine 1 is determined as idling in the step 1 based on the signal from the engine speed sensor 1c, control proceeds to steps 34 through 37. Since the exhaust energy is small because of the idling condition, the bypass actuator 1e is controlled to increase the speed of flow of the exhaust gases thereby increasing the speed of rotation of the turbine 6b. The voltage of electric power generated by the rotary electric machine 7 operating as the generator is measured by the voltage sensor 7c, and compared with the battery voltage. Then, the generated voltage is controlled by the power converter 7a so as to be high enough to charge the battery 5a, after which control goes to the step 29 to charge the battery 5a.

Although a certain preferred embodiment has been shown and described, it should be understood that many changes and modifications may be made therein without departing from the scope of the appended claims.

What is claimed is:

1. A control system for a turbocharger including a turbine drivable by exhaust gases emitted from an internal combustion engine on a motor vehicle, a rotatable shaft coupled to the turbine, a compressor coupled to said rotatable shaft for charging air under pressure into the internal combustion engine, and a rotary electric machine coupled to the rotatable shaft, said control system comprising:

means for detecting the amount of depression of an accelerator pedal which controls operation of said internal combustion engine;

means for detecting the rotational speed of said internal combustion engine;

a battery mounted on said motor vehicle;

means for calculating a maximum engine torque corresponding to the rotational speed of said internal combustion engine when said accelerator pedal is fully depressed;

means for calculating an amount of electric power, to be supplied to said rotary electric machine, required to produce a maximum boost pressure corresponding to the calculated maximum engine torque; and means for supplying said calculated amount of electric power from said battery to said rotary electric machine.

2. A control system according to claim 1, further comprising means for detecting the boost pressure of air to be supplied to said internal combustion engine, and means for calculating an amount of fuel to be supplied which corresponds to said detected boost pressure and for controlling fuel control means for supplying said internal combustion engine with fuel in said calculated amount.

* * * * *